United States Patent [19]

Suzuki et al.

[11] Patent Number: 5,243,372
[45] Date of Patent: Sep. 7, 1993

[54] MOTOR DRIVEN ZOOMING APPARATUS

[75] Inventors: Hiroaki Suzuki; Isao Soshi, both of Tokyo, Japan

[73] Assignee: Asahi Kogyo Kogaku Kabushiki Kaisha, Tokyo, Japan

[21] Appl. No.: 670,195

[22] Filed: Mar. 15, 1991

[30] Foreign Application Priority Data

Mar. 16, 1990 [JP] Japan .................................. 2-65843

[51] Int. Cl.⁵ .............................................. G03B 1/18
[52] U.S. Cl. ........................................... 354/195.12
[58] Field of Search ................ 354/400, 195.1, 195.11, 354/195.12, 412

[56] References Cited

U.S. PATENT DOCUMENTS

| | | | |
|---|---|---|---|
| 4,290,679 | 9/1981 | Vockenhuber | 354/195.12 |
| 4,446,526 | 5/1984 | Iwanade | 364/525 |
| 4,560,267 | 12/1985 | Nakai et al. | 354/412 |
| 4,735,494 | 4/1988 | Makino et al. | 358/227 |
| 4,899,190 | 2/1990 | Hata | 354/195.12 |
| 4,936,664 | 6/1990 | Haraguchi et al. | 359/676 |
| 4,945,371 | 7/1990 | Hashimoto et al. | 354/195.13 |
| 4,951,075 | 8/1990 | Mokumaru et al. | 354/195.1 |
| 4,962,399 | 10/1990 | Numako et al. | 354/195.1 |
| 4,967,218 | 10/1990 | Numako et al. | 354/195.1 |
| 5,065,172 | 11/1991 | Ogawa | 354/195.1 |
| 5,134,432 | 7/1992 | Kohomoto et al. | 354/195.12 |
| 5,155,515 | 10/1992 | Kohomoto et al. | 354/195.1 |

FOREIGN PATENT DOCUMENTS

| | | |
|---|---|---|
| 0271019 | 6/1988 | European Pat. Off. . |
| 3921615 | 1/1990 | Fed. Rep. of Germany . |
| 53-48732 | 5/1978 | Japan . |
| 1246515 | 10/1989 | Japan . |
| 1080591 | 8/1967 | United Kingdom . |
| 1139342 | 1/1969 | United Kingdom . |
| 2223862 | 4/1990 | United Kingdom . |

OTHER PUBLICATIONS

Patent Abstracts of Japan, P-981, Dec. 22, 1989, vol. 13, No. 583.

Primary Examiner—David M. Gray
Attorney, Agent, or Firm—Sandler, Greenblum & Bernstein

[57] ABSTRACT

A motor driven zooming apparatus including a zoom lens, a driver for moving the zoom lens, and an extremity setting and storing device for storing data for restricting a zooming range of the zoom lens. A driver controller is provided for controlling the driver within the stored zooming range.

15 Claims, 5 Drawing Sheets

MOTOR DRIVEN ZOOMING APPARATUS

BACKGROUND OF THE INVENTION

1. Field of the Invention

The present invention relates to a motor driven zooming apparatus which is driven by the motor to vary a focal length of a lens, and more precisely, it relates to an apparatus for restricting the zooming range of a motor driven zoom lens.

2. Description of Related Art

In a known apparatus for restricting a zooming range of a zoom lens, as disclosed in Japanese Unexamined Patent Publication No. 53-48732, the angular displacement of a cam ring, which moves the zoom lens to change focal length, is mechanically restricted by adjustable stops. The zooming range can be optionally adjusted by adjusting the positions of the stops within predetermined limits.

However, if the known zooming range restricting apparatus is applied to a motor driven zoom lens, a collision would occur between the stops at the limits of the angular displacement of cam ring, thus resulting in decreased durability and controllability.

SUMMARY OF THE INVENTION

The primary object of the present invention is to provide a motor driven zoom lens in which the lens can be stopped at a predetermined focal length extreme position without a mechanical shock which would otherwise be caused by the collision.

To achieve the object mentioned above, according to the present invention, there is provided a motor driven zooming apparatus having a zoom lens, and a driver for moving the zoom lens. An extremity storing mechanism for storing data for restricting a zooming range of the zoom lens, and a driver controlling mechanism for driving the driver within the stored zooming range are provided.

With this arrangement, since the motor is stopped by the driver controlling mechanism at the end of the zooming, no mechanical collision takes place.

Preferably, the zooming apparatus further comprises a limit switch, so that the extremity setting and storing mechanisms store a present focal length detected by a focal length detecting mechanism as the telephoto extremity data or the wide angle extremity data when the limit switch is turned ON and the telephoto switch or the wide angle switch is turned ON.

Provision is also made for a comparison mechanism for comparing the focal length stored when the telephoto switch is turned ON and the focal length stored when the wide angle switch is turned ON.

Preferably, the extremity setting and storing mechanism stores a longer focal length and a shorter focal length as telephoto extremity data and wide angle extremity data, respectively.

The extremity setting and storing mechanism initializes the telephoto extremity data and the wide angle extremity data if the telephoto switch or the wide angle switch is turned ON when the limit switch is kept ON for a predetermined time.

According to another aspect of the present invention, there is provided a power zoom lens including a driving device for zooming the zoom lens and a focal length detecting mechanism for detecting a focal length which varies during the zooming. An extremity setting mechanism for setting extremities of the focal length of the zoom lens which restrict the zooming range of the zoom lens, a comparing mechanism for comparing focal length data detected by focal length detecting mechanism with focal length data set by the extremity setting mechanism, and a restricting mechanism for controlling the driving mechanism to hold the focal length data detected by focal length detecting mechanism within the zooming range defined by the focal length data set by the extremity setting mechanism, are also provided.

The present disclosure relates to subject matter contained in Japanese patent application No. 02-65843 (filed on Mar. 16, 1990) which is expressly incorporated herein by reference in its entirety.

BRIEF DESCRIPTION OF THE DRAWINGS

The invention will be described below in detail with reference to the accompanying drawings, in which.

DESCRIPTION OF PREFERRED EMBODIMENTS

FIGS. 1 through 5 show an embodiment of a motor driven zooming apparatus according to the present invention.

First, an arrangement of a circuit of a camera body and a lens will be described below with reference to FIG. 1.

The camera body 1 has a main CPU 10 which performs various photographing data processing operations. An object luminance (i.e., brightness) signal is input to the main CPU 10 from a light receiver 11 which receives light incident thereon through a photographing lens (not shown) to detect the luminance of an object to be photographed through an A/D converter 12 which converts the detected analog signal to a digital signal. Also, image data of an object is input to the main CPU 10 from an automatic focusing CCD 13 (AF-CCD) which receives an object image formed by the light incident thereon through a photographing lens, through a CCD processing circuit 14 which processes the output signal of the AF-CCD 13 into a focusing state detecting signal of the lens.

The camera body 1 is provided with an indicating means having an external LCD panel 15 which externally indicates the data output from the main CPU 10 and an LCD 16 within the view finder which indicates the output data of the main CPU 10 within the finder.

A driving means including an automatic focusing motor (AF motor) 17 for moving the lens for automatic focusing, and an exposure control, device 18 which controls a shutter and a diaphragm are also provided.

The AF motor 17 is connected to an AF motor driving circuit 19 which drives the AF motor 17 in accordance with the control signals from the main CPU 10. The main CPU 10 is also connected to an AF pulse generator 20 which generates a number of pulses to determine the angular displacement of the AF motor 17. The driving means transmits the driving force to the photographing lens through couplers (not shown) provided on a body mount and a lens mount, when the lens is attached to the camera body 1.

A battery 21 is provided in the camera body 1 to supply the power not only to the active elements of the camera body 1 but also to a motor and CPU (not shown) provided in the photographing lens.

The photographing lens 2 has therein a lens CPU 30 which is connected to the main CPU 10 of the camera body through electrical contacts provided on the mounts (not shown), a power zoom motor (PZ motor) 31 which varies the focal length of the lens, and a PZ motor driving circuit 32 which drives the PZ motor 31 in accordance with the control of the lens CPU 30.

The photographing lens 2 has a focusing mechanism (AF mechanism) 33 and a zooming mechanism (PZ mechanism) 34 for performing the focusing and zooming in accordance with the movement of lens groups which constitute the photographing lens 2 in the optical axis direction, caused by the rotation of the cam rings (not shown), respectively. The AF motor 18 and the PZ motor 30 rotate the respective cam rings of the AF mechanism 33 and the PZ mechanism 34. The zooming cam ring has a focal length detecting means 50 which includes a code plate and brushes (not shown) to detect the angular position of the cam ring. The zoom code ZC corresponding to the set focal length is input to the lens CPU 30.

Figure 1:
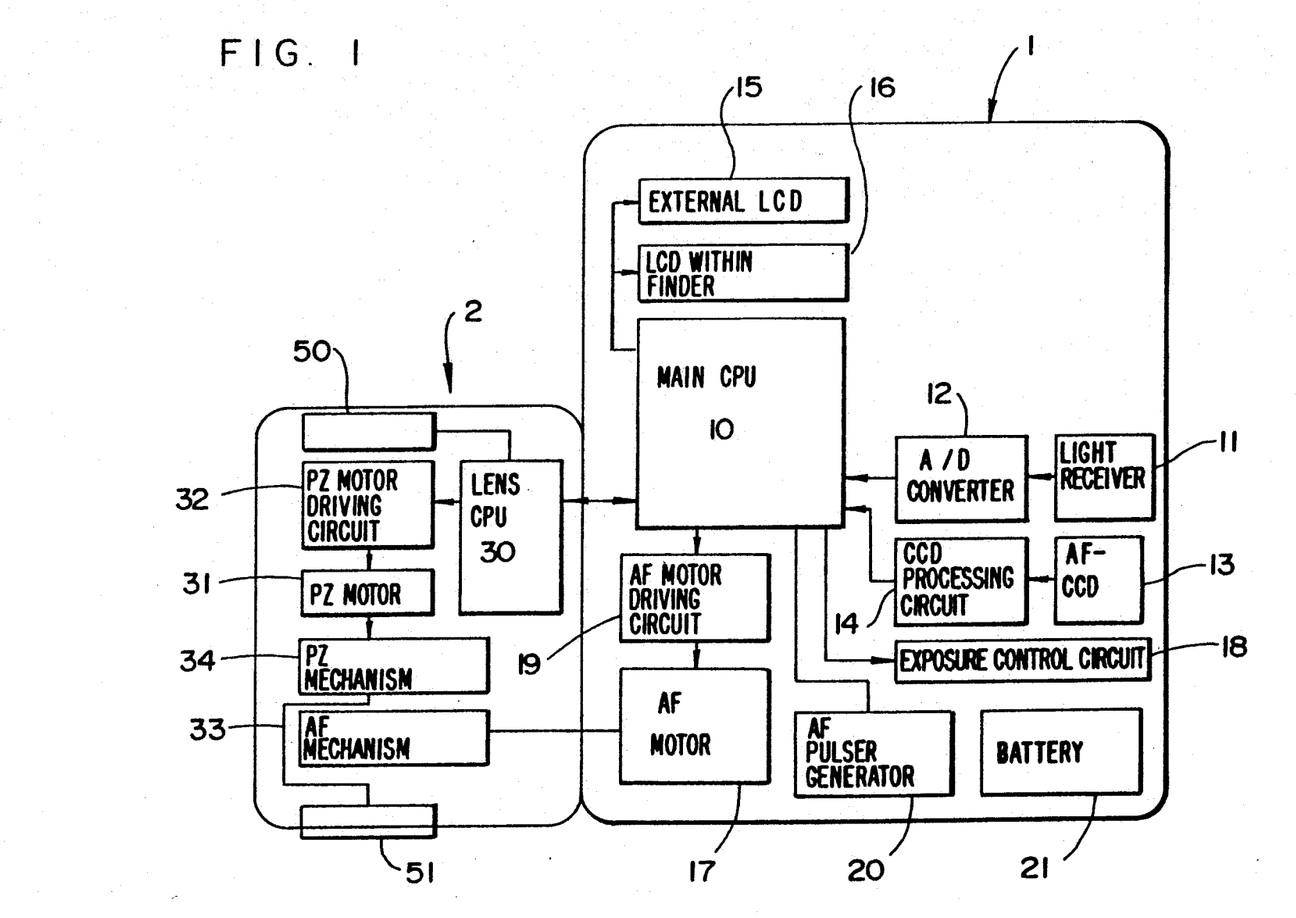
FIG. 1 is a block diagram of a motor driven zooming apparatus according to the present invention.
Figure 2:
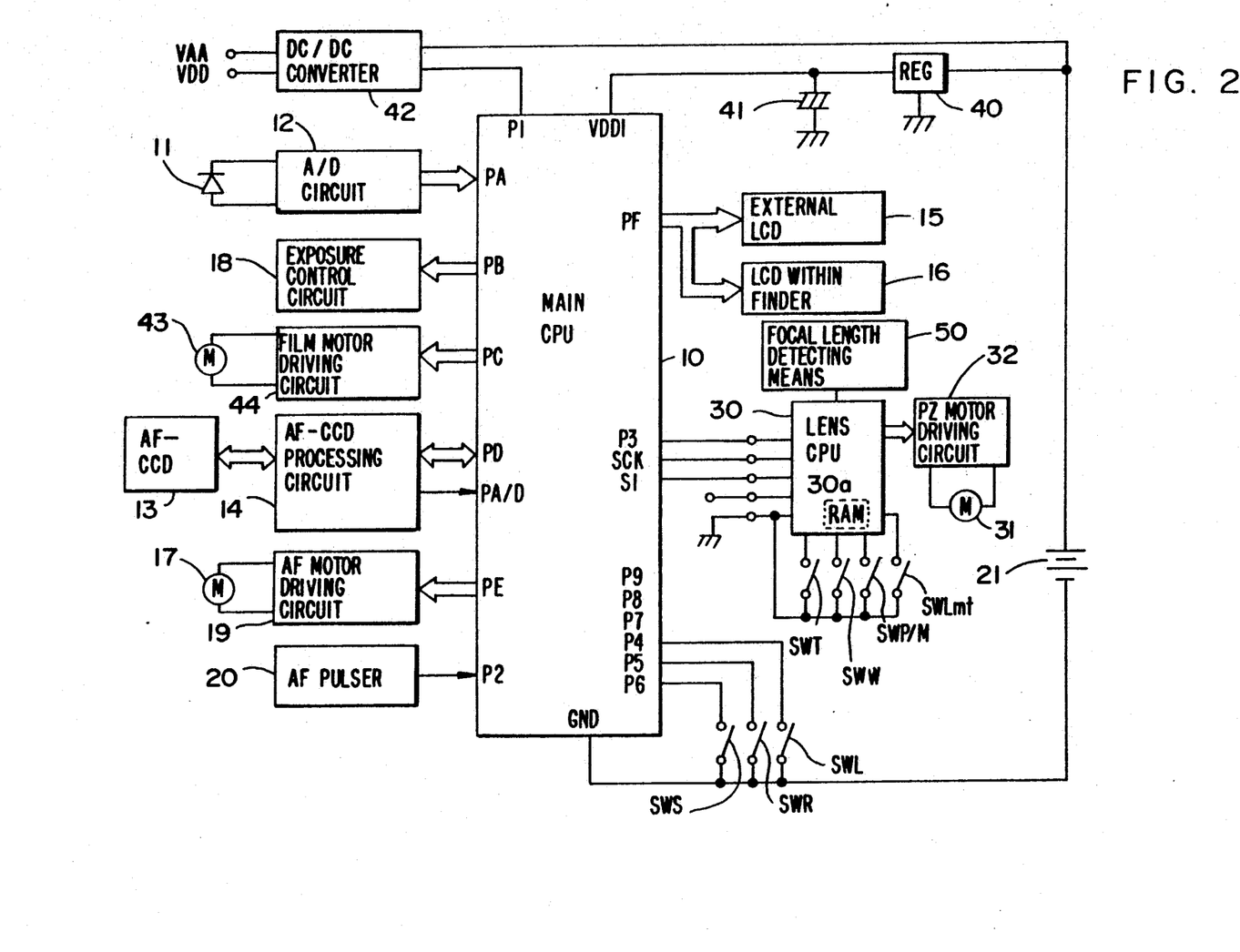
FIG. 2 is a circuit diagram of a motor driven zooming apparatus shown in FIG. 1.

FIG. 2 shows a circuit arrangement of the control system shown in FIG. 1.

The main CPU 10 is supplied with a voltage of the battery 21 which is regulated by a regulator 40 and backed up by a super capacitor 41, through a terminal VDD1 of the main CPU 10.

A terminal VAA of a DC/DC converter 42 is a power supply terminal for the AF-CCD 13 and the CCD driving circuit 14, and a terminal VDD of the DC/DC converter 42 is a power supply terminal for other driving system.

A terminal P2 of the main CPU 10 is connected to the AF pulse generator 20, so that the angular displacement of the AF motor 17 is input to the main CPU 10. Terminals P4, P5, and P6 of the main CPU 10 are connected to a lock switch SWL which is turned ON to bring the camera into a photographable position, a release switch SWR which is turned ON when the shutter button is pressed by full step and a photometer switch SWS which is turned ON when the shutter button is pushed by a half step, respectively, so that the respective switching data are input to the main CPU 10.

The other terminals of the switches SWL, SWR and SWS are connected to the ground side of the battery 21, together with the ground terminal Gnd of the main CPU 10. Consequently, when the switches SWL, SWR and SWS are turned ON, the corresponding terminals of the main CPU 10 become low level "L", so that the main CPU 10 detects that the switches are turned ON.

The main CPU 10 performs the intermittent operations, such as a switch scanning at a low voltage when the lock switch SWL is OFF. When the lock switch SWL is turned ON, and if the photometer switch SWS or the release switch SWR is turned ON, the active signals are output from the terminal P1 to activate the DC/DC converter 42 to thereby supply the respective circuits with the power, so that the camera is ready for continuous photographing operations.

The main CPU 10 is connected to the lens CPU 30 through a terminal P3 for outputting reset signals, a terminal SCK for outputting serial clock signals for communication, and a terminal SI for receiving serial information, respectively. Thus, the transmission of data and commands is effected between the main CPU 10 and the lens CPU 30, using command codes.

The terminals (contact groups) PA, PB, and PC of the main CPU 10 are connected to a photometering A/D circuit 12, an exposure control circuit 18, and a film motor driving circuit 44, respectively. The film motor driving circuit 44 drives a film motor 43 to wind and rewind a film, etc.

The terminals (contact groups) PD, PE, P2 of the main CPU 10 are connected to the CCD processing circuit 14, the AF motor driving circuit 19, and the AF pulser 20, respectively. The terminal PF of the main CPU 10 is connected to the two LCD's 15 and 16. As mentioned before, the A/D circuit 12, the CCD processing circuit 14 and the AF motor driving circuit 19 are connected to the photometering light receiver 11, the AF-CCD 13 and the AF motor 17, respectively.

The lens CPU 30 is connected to the following four power zooming switches.

A selection switch SWP/M is a slide switch which selects a power zoom mode in which the zooming is effected by the PZ motor 31 and a manual zoom mode in which the zooming is manually effected. Namely, when the selection switch SWP/M is moved to the power zoom mode, a clutch (not shown) incorporated in the PZ mechanism 34 is engaged (that is, the connection is established), so that the PZ mechanism 34 is driven by the PZ motor 31. Conversely, if the selection switch SWP/M is moved to the manual zoom mode, the clutch is disengaged (that is, the connection is broken), so that the PZ mechanism 34 is driven by a manual operating member means 51.

A limit switch SWLmt is a self-back or self-return switch which is used to set up and release a telephoto extremity and a wide angle extremity of the zooming range when the selection switch SWP/M is in the manual mode position.

Telephoto switch SWT and wide angle switch SWW are selfback switches which serve as a zooming operation member for moving the lens toward the telephoto side and the wide angle side, respectively when the power zoom mode, is selected. The telephoto switch SWT and the wide angle switch SWW are used to set up the extremities (limits) of the zooming range, so that when either of the switches SWT and SWW are actuated, together with the limit switch SWLmt, the present focal length is stored as telephoto extremity data or wide angle extremity data in a RAM 30a of the lens CPU 30.

The operation of the camera system as constructed above, is as follows (particularly see FIGS. 3 through 5).

Figure 3:
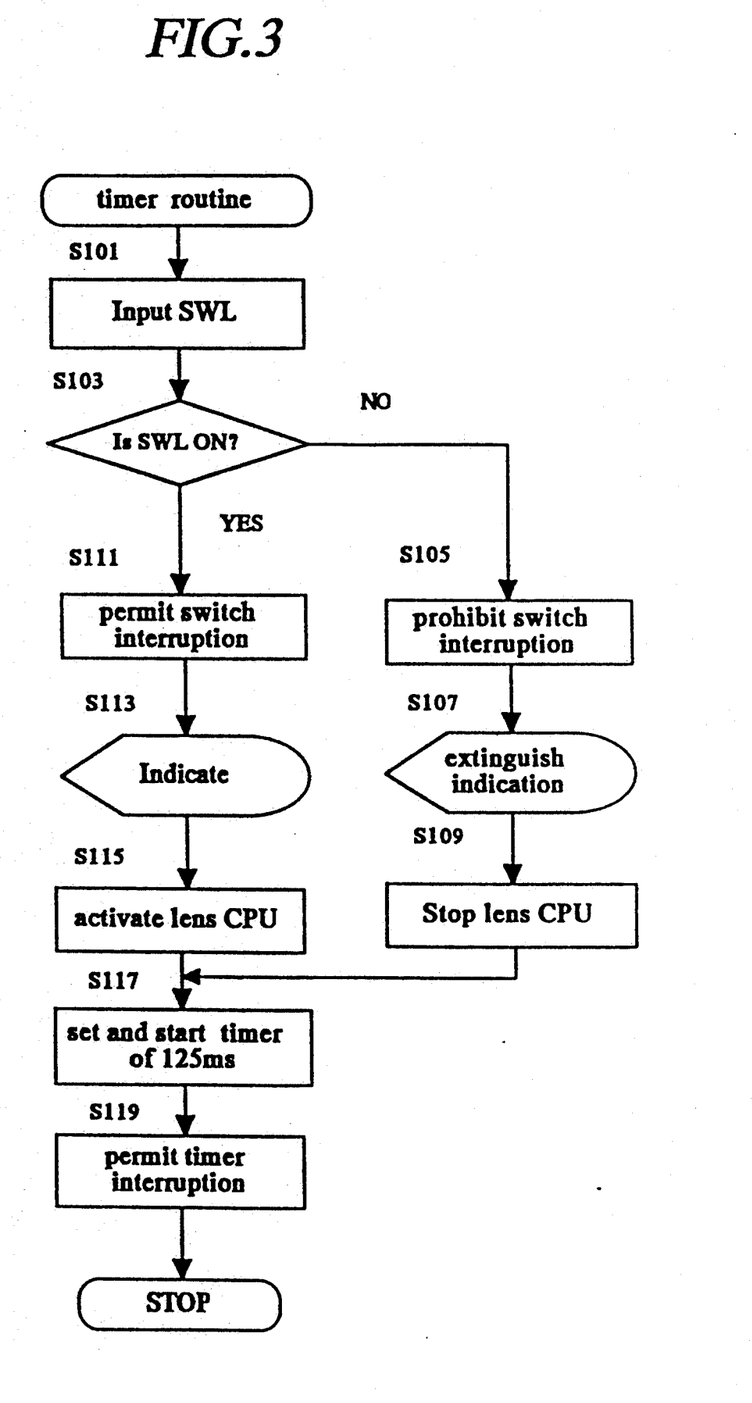
FIG. 3 is a flow chart of a timer routine of a main CPU in a motor driven zooming apparatus shown in FIG. 1.

FIG. 3 shows a timer routine of the main CPU 10.

In this routine, the camera is switched between a rest position and a stand-by position to take a picture, in accordance with the position of the lock switch SWL. If the photometering switch SWS or the release switch SWR is turned ON when the lock switch SWL is turned ON, the photographing routine interrupts the main routine to be performed by hardware.

When the lock switch SWL is turned OFF (steps S101, S103), the main CPU 10 prohibits the switch interruption of the main routine at step S105 and extinguishes the indication of the LCD's 15 and 16 at step S107, and if the lens CPU 30 is activated, the operation of the lens CPU 30 is also stopped (step S109).

Figure 5:
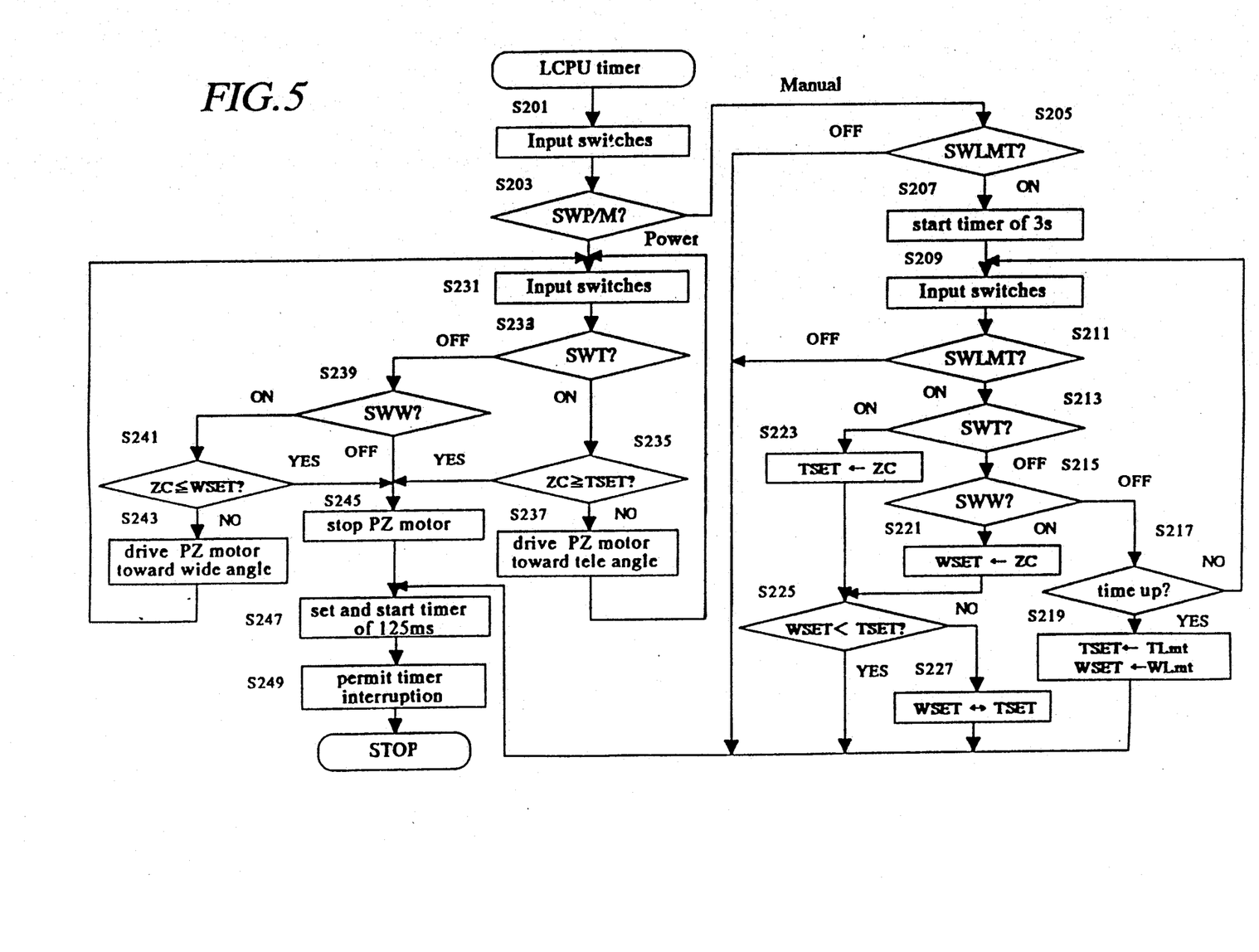

If the lock switch SWL is turned ON at step S103, the main routine can be interrupted by the switch interruption routine shown in FIG. 5 (step S111), so that the necessary data is indicated in the LCD's 15 and 16 to activate the lens CPU 30 (steps S113 and S115). Thus, the zooming operation can be effected. The operation of the lens CPU 30 is performed by changing the level of the terminal P3 from high "H" to low "L" to release the reset.

In any event, a timer of 125 ms is set (step S117), so that the main routine can be interrupted by a timer interruption routine (step S119). Consequently, the control stops. Accordingly, if the photometering switch SWS, etc. is not made ON, the main CPU 10 intermittently performs the main routine at a time interval of 125 ms, regardless of the position (state) of the lock switch SWL.

Figure 4:
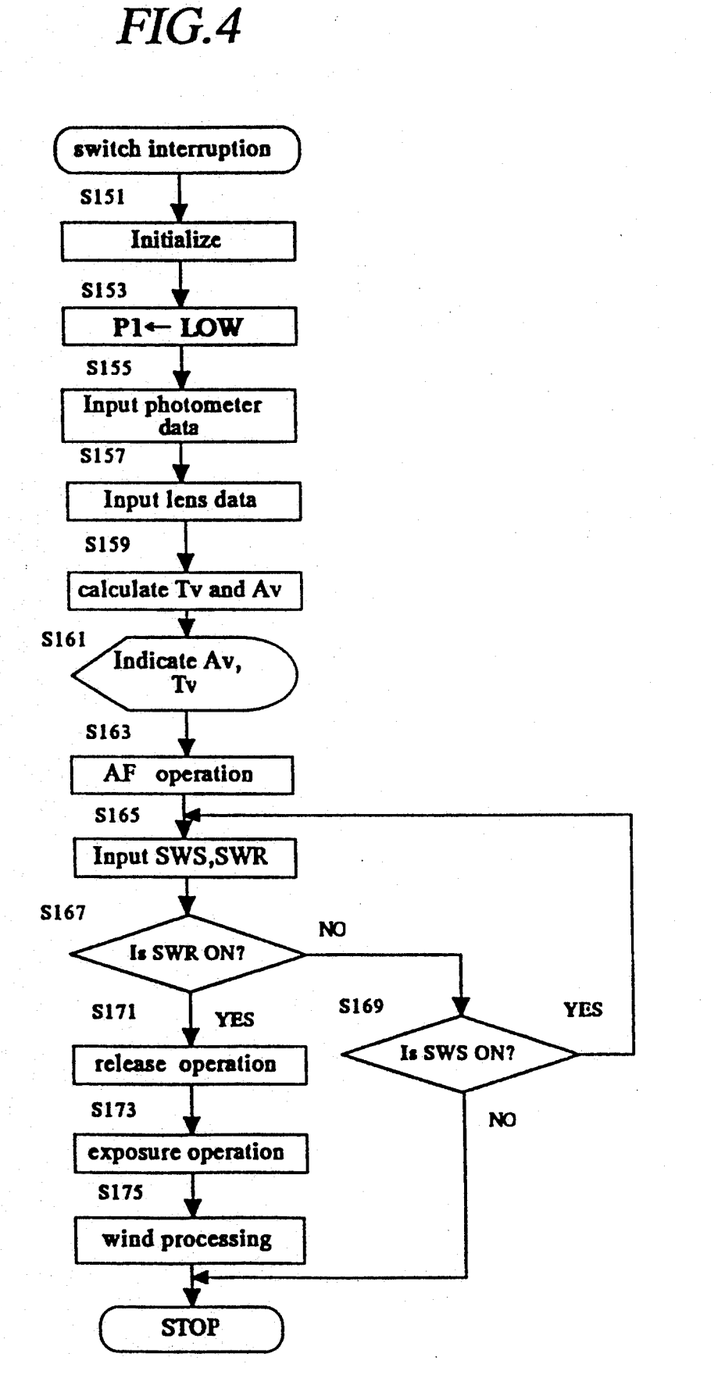
FIG. 4 is a flow chart of a switch fetching operation of a main CPU in a motor driven zooming apparatus shown in FIG. 1; and, FIG. 5 is a flow chart of a timer routine of a lens CPU in a motor driven zooming apparatus shown in FIG. 1.

FIG. 4 shows a switch interruption routine of the main CPU 10, in connection with the control of photographing. The switch interruption routine is performed when the photometering switch SWS or/and the release switch SWR are turned ON in the case that the main routine can be interrupted by the switch interruption routine at step S111 of the timer routine shown in FIG. 3.

The main CPU 10 initializes the set data at step S151 and sets the terminal P1 to the level "L" (step S153) to actuate the DC/DC converter 42, so that the active elements are supplied with power from the source.

Thereafter, the photometer data is input, and the serial clock signals are transferred from the terminal SCK to input the lens data from the terminal SI (steps S155 and S157).

Upon completion of the input of the lens data, the arithmetic operation (i.e., calculation) is performed to obtain a diaphragm value Av and a shutter speed Tv in accordance with the input data (step S159). The diaphragm value Av and the shutter speed Tv thus obtained, are indicated in the respective LCD panels (step S161).

The main CPU 10 judges whether the object is in focus or out of focus, in accordance with the output of the AF-CCD processing circuit 14. If the object is out of focus, the driving pulses are calculated in accordance with the amount of defocus and the AF motor 17 is driven to move the lens to thereby effect the focusing (step S163). The angular displacement of the AF motor 17 is detected by the AF pulser 20.

Thereafter, the states of the photometer switch SWS and the release switch SWR are input (step S165), and when the release switch SWR is turned ON (step S167) while the photometer switch SWS is turned ON, the diaphragm and the shutter are controlled to assume respective predetermined values to effect the exposure (steps S171 and S173). After that, the film is wound by one frame (step S175) and the control is returned to the timer routine.

If the photometer switch SWS is made OFF before the release switch SWR is made ON, the control is directly returned to the timer routine to continue the operations (steps S165, S167 and S169).

FIG. 5 shows the timer routine of the lens CPU 10.

In the illustrated zoom lens, a possible zooming range can be optionally adjusted within a maximum zooming range of the zoom lens. In the following discussion, it is supposed that the zoom codes TLmt and WLmt correspond to the telephoto extremity and the wide angle extremity, of the maximum zoom range, respectively, and the zoom codes TSET and WSET correspond to the telephoto extremity and the wide angle extremity, of the possible zoom range, respectively. These zoom codes are stored in the internal memory RAM 30a of the lens CPU 30 at predetermined addresses thereof. It is also supposed that the values of the zoom codes increase toward the telephoto extremity.

When the lens CPU 30 is activated, the states of the four switches connected to the lens CPU 30 are input thereto at step S201. Thereafter, whether the selection switch SWP/M is in the power zoom mode position or the manual zoom mode position is judged (step S203).

If the manual zoom mode is selected, the PZ motor 31 is disengaged from the zoom mechanism 34 by the disconnection of the clutch of the latter, so that the zooming can be manually and optionally effected. Note that in this case, there is no limitation of the zoom range, and accordingly, the zooming can be effected throughout the maximum zoom range of the zoom lens.

At the manual zoom mode, the lens CPU 30 judges whether the limit switch SWLmt is turned ON or OFF at step S205. If the limit switch SWLmt is made OFF, the timer of 125 ms is set and starts without performing the setting and release of the extremities of the zooming range (steps S205 and S247). Consequently, the interruption of the main routine by the timer routine is permitted and the operation ends (step S249).

If the limit switch SWLmt is made ON at step S205, the timer of 3 seconds is set and starts at step S207 to perform the setting and release of the extremities of the possible zooming range (steps S211 through S217). Namely, if the telephoto switch SWT is turned ON before the set time is up (step S213), the telephoto extremity code TSET is replaced with the zoom code (focal length code) ZC corresponding to the present focal length (step S223). If the wide angle switch SWW is turned ON, the wide angle extremity code WSET is replaced with the focal length code ZC (step S221).

Thereafter, at step S225, the telephoto extremity code TSET is compared with the wide angle extremity WSET. If the telephoto extremity code TSET is smaller than the wide angle extremity WSET, the telephoto extremity code TSET is replaced with the wide angle extremity WSET and vice versa (step S227). As a result, that the focal length represented by the telephoto extremity code is smaller than the focal length represented by the wide angle extremity code is provided. Furthermore, the possible zoom range can be finally and correctly set, whichever switch (telephoto switch or wide angle switch) is used upon setting the extremities of the possible zoom range.

If only the limit switch SWLmt is kept ON for more than three seconds without actuating the telephoto switch and the wide angle switch, the set time of the timer is up, so that the telephoto extremity code TSET is replaced with a telephoto extremity code TLmt corresponding to the focal length of the telephoto extremity of the maximum zoom range of the lens, and the wide angle extremity code WSET is replaced with a wide angle extremity code WLmt corresponding to the focal length of the wide angle extremity of the maximum zoom range of the lens, respectively (steps S217 and S219).

When neither the telephoto switch nor the wide angle switch are not made ON, if the limit switch SWLmt is released before the set time of the timer is up, the interruption of the main routine by the timer routine is permitted without performing the operation for setting the extremities of the zoom range (steps S211, S247 and S249).

In this embodiment, when a photographer attempts to restrict the zoom range. he or she manually moves the lens to a desired focal length and actuates the telephoto switch SWT or the wide angle switch SWW while actuating the limit switch SWLmt, so that the focal length code of the telephoto extremity or the wide angle extremity can be set.

If a photographer continues pressing the limit switch SWLmt for more than three seconds, the set extremity focal length code is initialized, so that the maximum zoom range can be set.

The following discussion will be directed to the operation when the power zoom mode is selected by the selection switch SWP/M.

When the power zoom mode is selected, the PZ motor 31 is connected to the zoom mechanism 32 by the clutch of the latter, so that the power zooming can be effected by the PZ motor 31.

If the telephoto switch SWT is turned ON and the present focal length code ZC is smaller than the telephoto extremity code TSET, the PZ motor 31 is driven to change the focal length toward the telephoto side (steps S233, S235 and S237). If the wide angle switch SWW is turned ON and the present focal length code ZC is larger than the wide angle extremity code WSET. the PZ motor 31 is driven to change the focal length toward the wide angle side (steps S233, S239, S241 and S243).

If both the telephoto switch SWT and the wide angle switch SWW are made OFF, or if the present focal length detected by the focal length detecting means 50 is identical to the focal length at the telephoto extremity or the wide angle extremity, set by the photographer, the PZ motor 31 stops (steps S233, S235 and S245, or steps S233, S239, S241 and S245). Thereafter, the interruption by the timer routine is permitted and the operation ends (steps S247 and S249).

Namely, the power zooming can be effected by the operation of the telephoto switch SWT or the wide angle switch SWW, only within the possible zoom range which is optionally and manually set at the manual zoom mode, as mentioned above, so that the PZ motor 31 stops at the set extremity of the zoom range, and accordingly, no power zooming can be effected beyond the set zoom range.

The setting means of the extremities of the zoom range is not limited to the above mentioned embodiment in which the lens is manually moved, but can be realized for example by a numerical control from the camera body side.

Furthermore, it is also possible to set the extremities of the zoom range even at the power zoom mode. In this alternative, for example, an additional step for checking the limit switch SWLmt is inserted between steps S231 and S233, so that if the limit switch SWLmt is made OFF, the control proceeds to step S233, and if the limit switch SWLmt is made ON, the setting operation is performed.

Although the embodiment mentioned above is applied to a single lens reflex camera, the present invention can be generically applied to a camera having a motor driven zoom lens, for example even to a so-called compact camera in which the lens cannot be exchanged.

As can be understood from the foregoing, according to the present invention, since the motor can be stopped by an electrical stop means, there is no shock at the moment of stoppage, unlike the prior art in which the shock occurs due to the mechanical collision between the stop members, and accordingly, the zoom range can be precisely restricted.

We claim:

1. A motor driven zooming apparatus comprising:
a zoom lens;
a driver for moving said zoom lens;
extremity setting and storing means for storing data for restricting a zooming range of said zoom lens within a stored zooming range, said extremity setting and storing means being capable of being selectively reset; and
driver controlling means for driving said driver within said stored zooming range.

2. A motor driven zooming apparatus according to claim 1, wherein said data includes focal length data.

3. A motor driven zooming apparatus according to claim 1, further comprising focal length detecting means for detecting the present focal length of the zoom lens.

4. A motor driven zooming apparatus according to claim 3, wherein said driver comprises a motor.

5. A motor driven zooming apparatus according to claim 4, wherein said extremity setting and storing means stores a longest focal length and a shortest focal length of the zooming range as a telephoto extremity data and a wide angle extremity data, respectively.

6. A motor driven zooming apparatus according to claim 5, further comprising a selection means for switching between a power zoom mode in which the zooming is effected by the motor and a manual zoom mode in which the zooming is manually effected.

7. A motor driven zooming apparatus according to claim 5, further comprising a telephoto switch and a wide angle switch, so that said driver controlling means moves the driver toward a telephoto side when the telephoto switch is turned ON, or a wide angle side when the wide angle switch is turned ON.

8. A motor driven zooming apparatus according to claim 7, further comprising a limit switch, so that said extremity setting and storing means stores a present focal length detected by the focal length detecting means as the telephoto extremity data or the wide angle extremity data when the limit switch is turned ON and the telephoto switch or the wide angle switch is turned ON.

9. A motor driven zooming apparatus according to claim 8, further comprising comparing means for comparing the focal length stored when the telephoto switch is turned ON and the focal length stored when the wide angle switch is turn ON.

10. A motor driven zooming apparatus according to claim 9, wherein said extremity setting and storing means stores a longer focal length and a shorter focal length as telephoto extremity data and wide angle extremity data, respectively.

11. A motor driven zooming apparatus according to claim 10, wherein said extremity setting and storing means initializes the telephoto extremity data and the wide angle extremity data if the telephoto switch or the wide angle switch is made ON when the limit switch is kept ON for a predetermined time.

12. A motor driven zooming apparatus according to claim 11, wherein the initialized data includes longest and shortest focal length data peculiar to the zoom lens.

13. A motor driven zooming apparatus according to claim 10, wherein said driver controlling means drives the driver toward the telephoto side or the wide angle side if the telephoto switch or the wide angle switch is turned ON when the limit switch is not turned ON.

14. A motor driven zooming apparatus according to claim 10, wherein said driver controlling means stops the driver when the focal length data detected by the focal length detecting means is identical to the stored telephoto extremity data or the stored wide angle extremity data.

15. A power zoom lens including driving means for zooming the zoom lens and focal length detecting means for detecting a focal length, which varies during the zooming, comprising:

extremity setting means for setting extremities of the focal length of the zoom lens which restrict the zooming range of the zoom lens, said extremity setting and storing means being capable of being selectively reset;

comparing means for comparing focal length data detected by said focal length detecting means with focal length data set by said extremity setting means; and restricting means for controlling said driving means to hold the focal length data detected by said focal length detecting means within the zooming range defined by the focal length data set by said extremity setting means.

* * * * *

UNITED STATES PATENT AND TRADEMARK OFFICE
CERTIFICATE OF CORRECTION

PATENT NO. : 5,243,372
DATED : September 7, 1993
INVENTOR(S) : H. SUZUKI et al.

It is certified that error appears in the above-indentified patent and that said Letters Patent is hereby corrected as shown below:

On the cover, in section [73], Assignee, line 1, change "Kogyo Kogaku" to ---Kogaku Kogyo---.

Signed and Sealed this

Twenty-fifth Day of June, 1996

Attest:

BRUCE LEHMAN

*Attesting Officer*     *Commissioner of Patents and Trademarks*